United States Patent
Ochotta

(10) Patent No.: US 7,444,349 B1
(45) Date of Patent: Oct. 28, 2008

(54) CONTROL OF CONCURRENT ACCESS TO A PARTITIONED DATA FILE

(75) Inventor: Emil S. Ochotta, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 587 days.

(21) Appl. No.: 10/444,912

(22) Filed: May 23, 2003

(51) Int. Cl.
*G06F 7/00* (2006.01)
*G06F 17/00* (2006.01)

(52) U.S. Cl. .......................................... 707/102; 707/8

(58) Field of Classification Search ........................ None
See application file for complete search history.

(56) References Cited

U.S. PATENT DOCUMENTS

| | | | | |
|---|---|---|---|---|
| 5,717,919 | A * | 2/1998 | Kodavalla et al. | 707/8 |
| 5,918,229 | A * | 6/1999 | Davis et al. | 707/10 |
| 5,950,205 | A * | 9/1999 | Aviani, Jr. | 707/103 R |
| 6,012,085 | A * | 1/2000 | Yohe et al. | 709/217 |
| 6,029,190 | A * | 2/2000 | Oliver | 718/107 |
| 6,041,394 | A * | 3/2000 | Halligan et al. | 711/166 |
| 6,714,951 | B2 * | 3/2004 | Bills et al. | 707/202 |
| 6,772,206 | B1 * | 8/2004 | Lowry et al. | 709/223 |

OTHER PUBLICATIONS

Microsoft Computer Dictionary, Fifth Edition, 2002, p. 472.*
Vivek Singhal et al.; "Texas: An Efficient, Portable Persistent Store"; Fifth International Workshop on Persistent Object Systems; San Miniato, Italy; Sep. 1992; pp. 1-19.
Charles Lamb; "The Objectstore Database System"; Oct. 1991/vol. 34, No. 10/Communications of the ACM; 50-63.
Sheetal V. Kakkad et al.; "Address Translation Strategies in the Texas Persistent Store"; 5th UNSENIX Conference on Object-Oriented Technologies and Systems (COOTS '99); 199 by the UNSENIX Association; 16 pgs.
Seth J. White et al.; "QuickStore: A High Performance Mapped Object Store"; VLDB Journal, 4 629-673 (1995); Copyright VLDB; Received Sep. 8, 1994; pp. 629-673.
James L. Peterson, et al.; "Operating System Concepts"; published by Addison-Wesley Publishing Company; Copyright 1983; pp. 319-323.

* cited by examiner

*Primary Examiner*—Apu Mofiz
*Assistant Examiner*—Susan Chen
(74) *Attorney, Agent, or Firm*—Leroy D. Maunu

(57) ABSTRACT

Method and apparatus for controlling concurrent access to a data file. The data file is organized into a plurality of partitions, and a lock file that is accessible to the client applications is persistently stored. The lock file includes lock objects that correspond to the plurality of partitions, and each lock object indicates a lock status of the corresponding partition. The client applications perform an atomic file system operation on a persistent file system object when exclusive access is sought to the lock file. Successful completion of the atomic file system operation indicates that a client application has exclusive control over the lock file, and the lock file may thereafter be updated, the atomic operation undone, and access made to a selected partition.

14 Claims, 5 Drawing Sheets

CONTROL OF CONCURRENT ACCESS TO A PARTITIONED DATA FILE

FIELD OF THE INVENTION

The present invention generally relates to controlling concurrent access to file data.

BACKGROUND

When a software application is first developed, the data it references may be organized in separate files. From the application developer's perspective, this organization may be convenient when the application is in its infancy. However, as an application evolves and requirements change, many more files may be introduced into the application data set. At some point, the number of files may prove to be a burden from the developer's perspective. Thus, over time the notion of having separate files may progress from being desirable to being problematic.

While potentially problematic in some regards, maintaining a data set in separate files may be advantageous for supporting requirements for concurrent access to the data set. If the data are distributed across many files, management of concurrent access may be of lesser concern if concurrent access is rarely needed to the data in a single file.

Given various complexities associated with programmatically tracking a large number of files in a data set, certain circumstances may call for consolidating the data set into a single file or just a few files. However, some applications may have multiple processes which require concurrent access to the data set. If the data set is concentrated in just a few files and concurrent access is frequent, then efficient management of concurrent access may be of greater concern.

Data management software, for example, a database management system, may be used to control concurrent access to a data set. However, some applications may be unsuitable for implementation using data management software because this software may be cumbersome to install and maintain and may introduce significant overhead.

A system and method that address the aforementioned problems, as well as other related problems, are therefore desirable.

SUMMARY OF THE INVENTION

The various embodiments of the invention provide for controlling concurrent access to a data file. The data file is organized into a plurality of partitions, and a lock file that is accessible to the client applications is persistently stored. The lock file includes lock objects that correspond to the plurality of partitions, and each lock object indicates a lock status of the corresponding partition. The client applications perform an atomic file system operation on a persistent file system object when exclusive access is sought to the lock file. Successful completion of the atomic file system operation indicates that a client application has exclusive control over the lock file, and the lock file may thereafter be updated, the atomic operation undone, and access made to a selected partition.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention support concurrent access to a persistent, partitioned data file. A lock file is used to manage the status of locks associated with the partitions of the data file, and an atomic operation on a persistent file system object is used as the semaphore to control access to the lock file. Each application seeking access to the lock file must first obtain the semaphore. Use of an atomic file system operation permits the file system to be used as the mechanism that limits access to the semaphore, thereby limiting access to the lock file and the various partitions.

Figure 1:
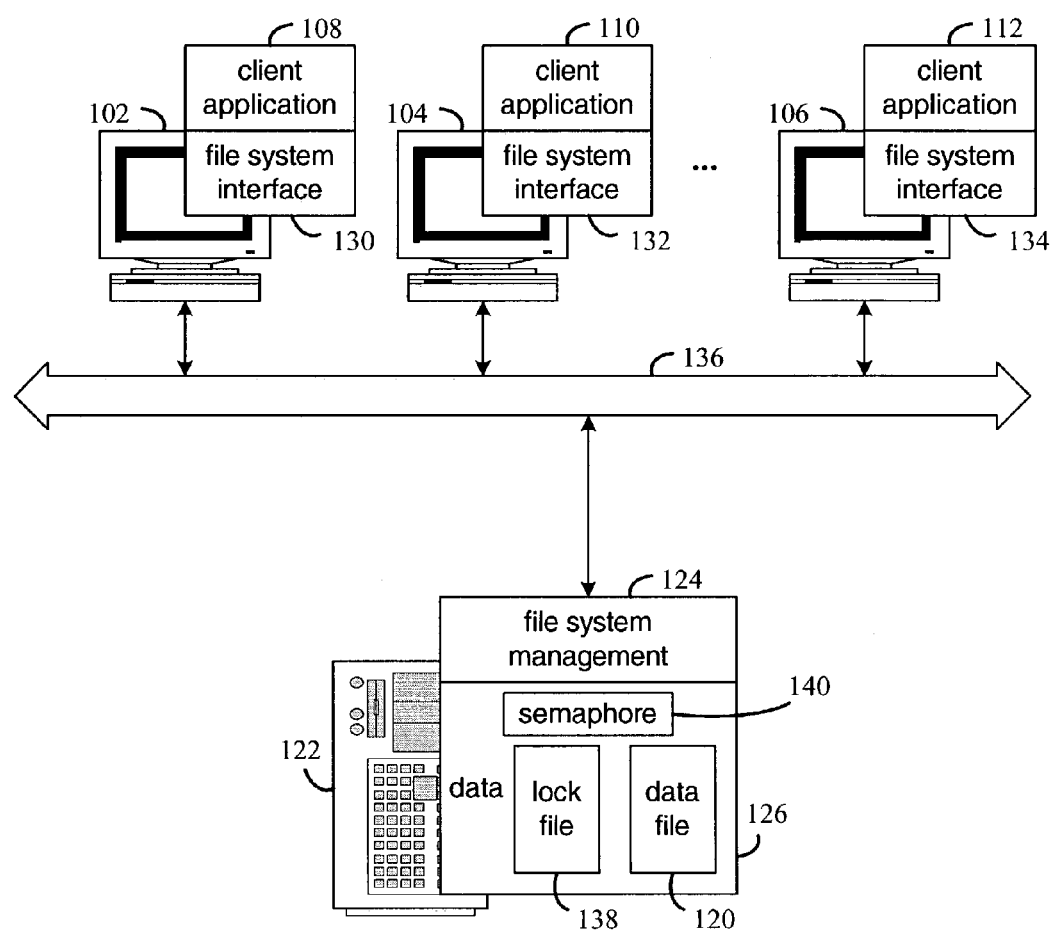
FIG. 1 illustrates a computing arrangement in which various embodiments of the invention may be used.

FIG. 1 illustrates a computing arrangement 100 in which various embodiments of the invention may be used. The arrangement includes multiple client systems 102, 104, and 106 that host respective client applications 108, 110, and 112. The client applications share access to a data set that is stored in data file 120.

The data file may be hosted by a single file server system 122 or within a distributed file system, depending on implementation requirements. In either scenario, a file management system 124 is used to manage a collection of data files 126, which includes the data file 120 of interest to the client applications. Each client system also hosts a file system interface component 130, 132, or 134 that provides the interface to the file management system 124 for access to the data file 120. The client systems and server system(s) are coupled via network 136, the characteristics of which depend on implementation requirements.

To support concurrent access by the client applications, data file 120 is partitioned according to implementation requirements. That is, while one client application is accessing one partition, another client application may access another partition. The partitions may be of equal sizes or the sizes may vary from one partition to another.

In the example embodiment, the lock status of each partition may be in one of three states: unlocked, exclusive lock, or read-only lock. When a partition is unlocked, the partition is available to be locked by a client application, either exclusively or for read-only access. The client applications are expected to obtain a lock on a partition before performing any read or write operation on the partition.

A client application obtains an exclusive lock on a partition when the client application seeks to write to the partition. When one client application has an exclusive lock on a partition, the other client applications are expected to refrain from writing to the partition, and should another client application access data in the partition the integrity of any data read from the partition cannot be guaranteed. The embodiments described herein assume only a single writer is allowed in each partition. However, it will be appreciated that the embodiments could be extended to manage multiple writers per partition.

When a partition has a read-only lock, multiple client applications may read from the partition, and client applications are expected to refrain from writing to the partition.

Client applications are expected to respect whether a lock is granted. For example, even though a lock may be denied to a client application, there is no central gate keeper that would prevent a client application from accessing the data file. This lock mechanism relies on the integrity of each client application. This simplifies and supports efficient management of concurrent access.

The lock status information for the partitions is stored as a lock file(s) 138, which is accessible to the client applications. The lock file 138 and data file 120 may be subject to the same file system management 124, or may be under separate file systems depending on implementation requirements. Storing the partitions' lock status information as a file allows the client applications to determine the status of the partitions without requiring a specially adapted, or commercially available, centralized lock manager. The file system together with integrity of the client applications is used to manage concurrent access.

Each of the client applications reads from and writes to the lock file 138, and therefore, access to the lock file must be controlled. Access to the lock file is controlled and serialized via semaphore 140. Conceptually, the semaphore may be viewed as a lock that can be obtained by only one client application. The semaphore must be obtained before a client application reads from or writes to the lock file. The semaphore is released when the operation on the lock file is complete.

In an example embodiment, the semaphore is implemented as a status code returned from an operation on a file system object. For example, creating a directory in the file system is used as the semaphore. This operation is atomic. That is, the file system management 124 ensures that this file system operation is complete before another file system operation is allowed. Each client application that needs access to a partition is configured to attempt to create the same directory whenever the partition is to be locked. Thus, if a client application attempts a create-directory operation and receives a status code from the file system indicating that the operation was successful, then the semaphore belongs to that client application. If a client application attempts a create-directory operation and receives a status code from the file system indicating that the operation failed, then the semaphore belongs to another client application and the requesting client application must wait and retry. It will be appreciated that other file system operations may be used to implement the semaphore function depending on implementation requirements and file system capabilities. In other embodiments the semaphore mechanism may be implemented by any other technique known to one of ordinary skill in the arts, as long as the semaphore is accessible to all client applications that need access to the lock file.

Because there is no centralized lock manager, each client application is required to implement a deadlock detection and/or avoidance mechanism. Those techniques that are commonly used in distributed lock management may be implemented by the client applications.

Even though a network arrangement of client systems is used to illustrate hosting of multiple client applications, it will be appreciated that one, more, or all of the client applications could be hosted on a single system. Control over concurrent access via the file system may be desirable in arrangements with one or just a few client systems for the reasons set forth above. The various embodiments of the invention supports scalability from a single system to multiple systems.

Figure 2:
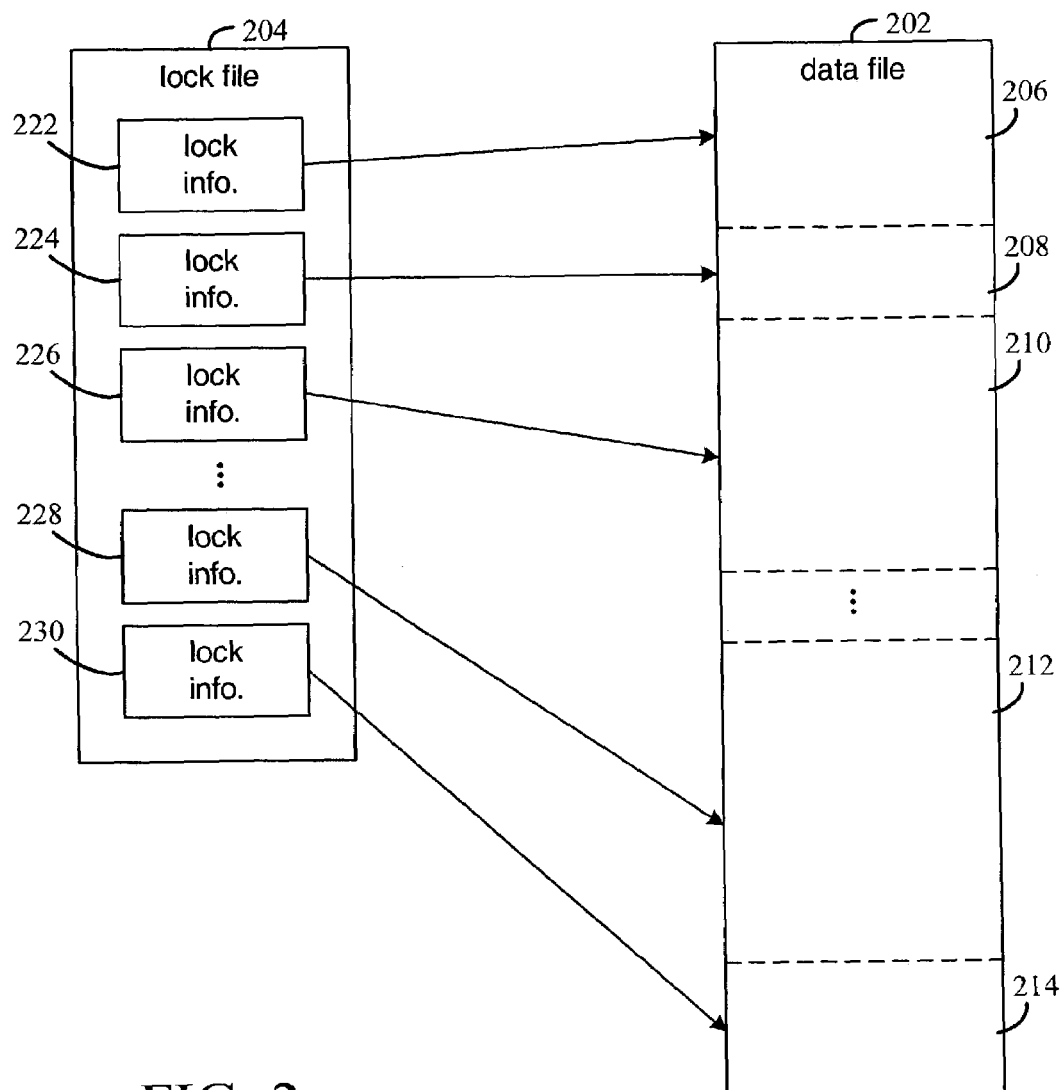
FIG. 2 is a block diagram that illustrates a partitioned data file and an associated lock file.

FIG. 2 is a block diagram that illustrates a partitioned data file 202 and an associated lock file 204. The data file is divided into multiple partitions 206, 208, 210, 212, and 214, and the lock file includes lock information objects 222, 224, 226, 228, and 230 that are associated with the partitions.

The partitions of data file 202 are illustrated in a logical view rather than a physical view. That is, even though the partitions are shown as being contiguous in the logical view, it will be appreciated that there is no requirement that the partitions be physically contiguous. However, to preserve data integrity the partitions should not physically overlap.

Each lock information object describes the lock status of an associated partition and includes information that defines the partition with which the lock information is associated. For example, lock information object 222 describes partition 206.

The lock information includes the type of lock held on the partition, a timestamp indicating the time at which the partition was locked, an identifier of the system hosting the client application, an identifier of the user using the client application, the name of the client application, an identifier of the process executing the client application, and the partition number. At system initialization, the lock file starts as being empty. As lock requests are made and locks are obtained, the lock file is updated accordingly.

Figure 3:
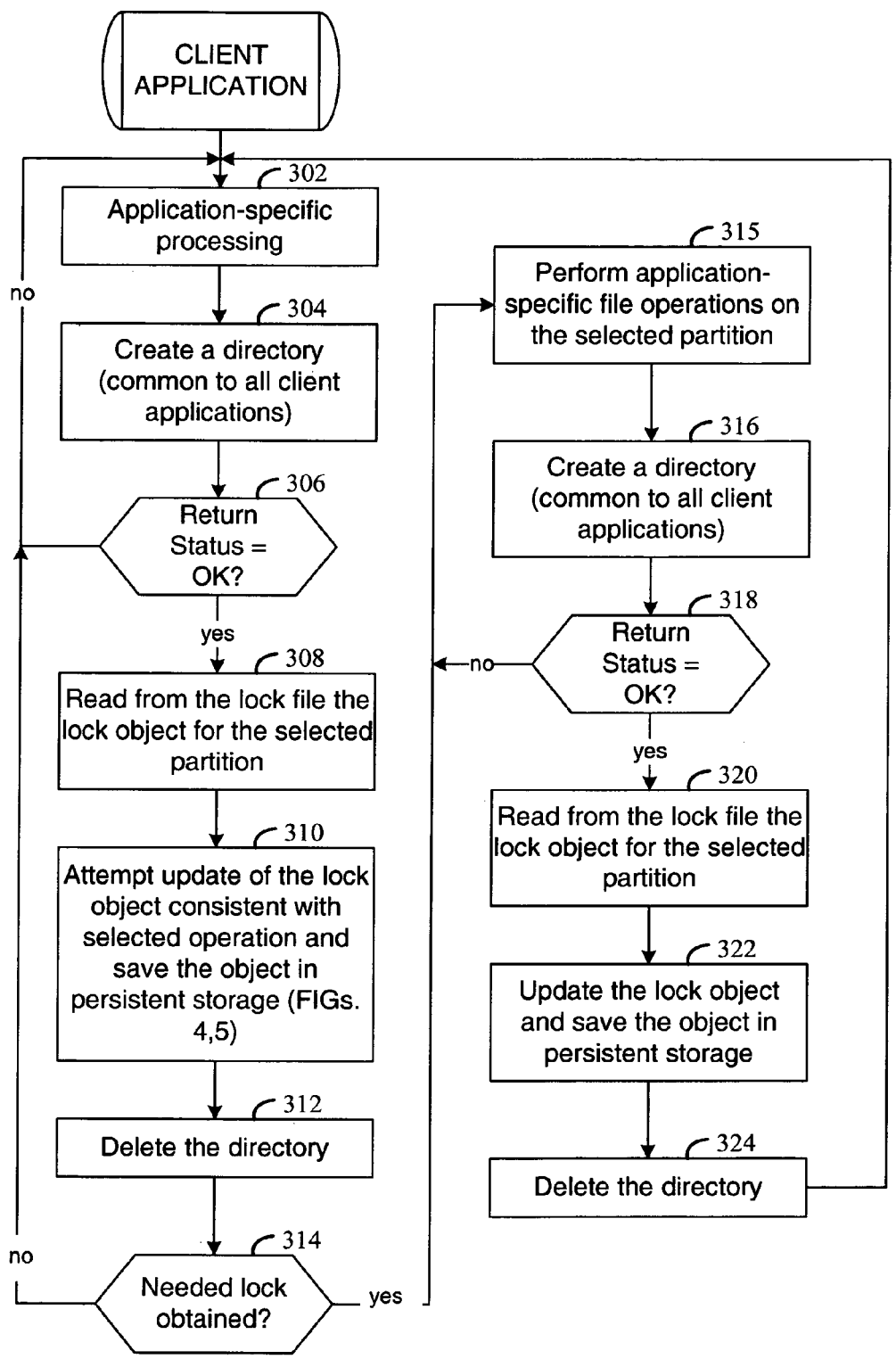
FIG. 3 is a flowchart of an example process implemented by a client application for accessing a file in accordance with various embodiments of the invention.

FIG. 3 is a flowchart of an example process implemented by a client application for accessing a file in accordance with various embodiments of the invention. The process generally entails obtaining the semaphore, procuring the needed lock on a selected partition, performing a file operation, and releasing the lock.

If a client application needs to access a shared data file during its application-specific processing (step 302), the client application attempts to create a directory (step 304). Each client application attempts to create the same directory when the semaphore is needed. Thus, if a first client application has already created the directory and thereby obtained the semaphore, a second client application will receive an error status code if an attempt is made to create the same directory. If the directory was not successfully created (decision step 306), the process returns to perform further application-specific processing. The client application may choose to repeat the attempt to create the directory or abandon the operation.

If the directory is successfully created, the lock information object that defines the partition to be accessed is obtained from the lock file (step 308). The client application then attempts to update the lock status in the lock information object according to the file operation to be performed (step 310). Because different operations require different types of locks, the client application may be unable to obtain the desired lock.

After attempting to obtain the desired lock, the directory is deleted (step 312), which permits other client applications to access the lock file. If the client application obtained the desired lock (decision step 314), the process performs application-specific file operations on the selected partition (step 315). Otherwise, the process returns to step 302 to perform other application-specific processing, such as waiting and retrying to obtain the desired lock.

When access to the selected partition is no longer needed, the client application performs the create-directory operation in an attempt to obtain the semaphore (step 316). The client application repeats the create-directory operation until the directory is successfully created (decision step 318).

The lock information object is once again read from the lock file (step 320), and the lock status is updated to indicate that the lock held by the client application has been released (step 322). Once the lock information object has been written to persistent storage, the directory is deleted (step 324) and the process returns to perform further application-specific processing (step 302).

Figure 4:
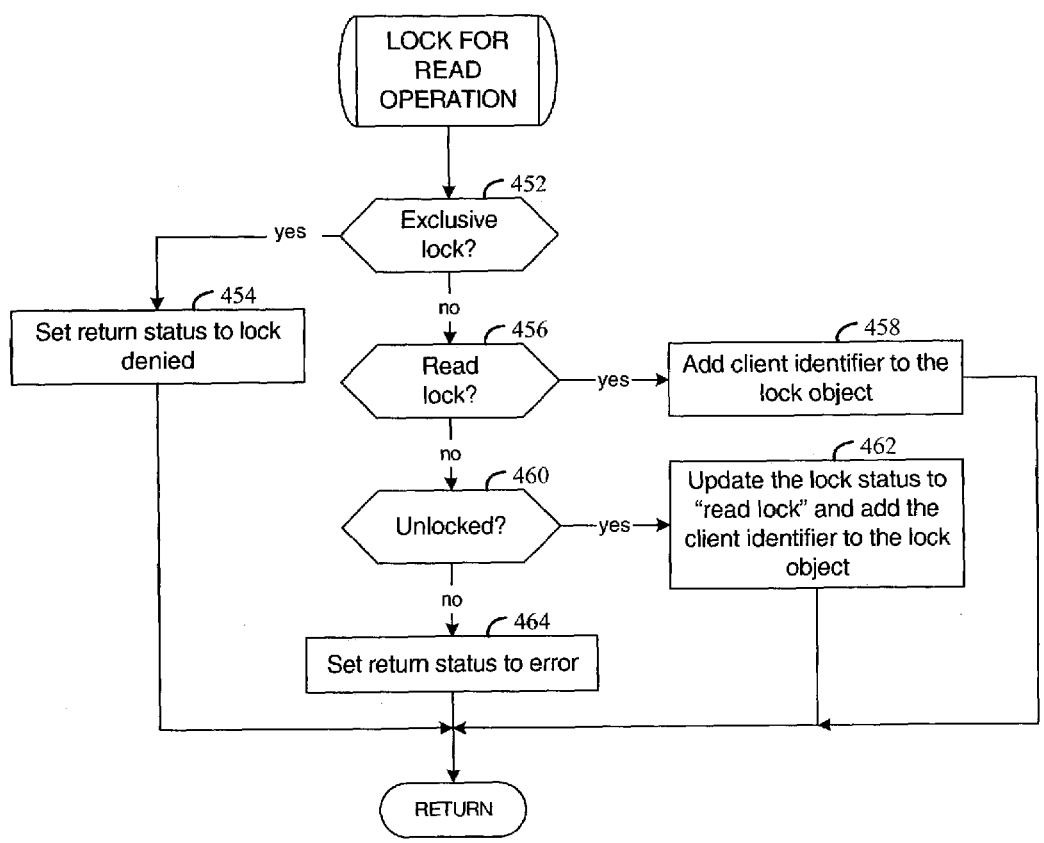
FIG. 4 is a flowchart of an example process implemented by a client application for obtaining a lock on a partition in support of a read operation.

FIG. 4 is a flowchart of an example process implemented by a client application for obtaining a lock on a partition in support of a read operation. The illustrated process steps assume that the semaphore has been obtained and the appropriate lock information object has been read.

If the desired partition is presently exclusively locked (decision step 452), a status code is returned to indicate that the needed lock cannot be obtained (step 454) and control is returned to step 310 (FIG. 3) of the client application. Otherwise, the process checks whether there is read lock on the partition (decision step 456). If so, a client application identifier of the client application seeking the lock is added to the lock information object (step 458). The identifiers of all client applications currently holding read locks are stored in the lock information object.

If the desired partition is presently unlocked (decision step 460), the lock status is set to read lock and the client application identifier is added to the lock information object (step 462). An error status is returned if the lock status has an illegal value (step 464).

It will be appreciated that when a read lock is released by a client application, the application's identifier is removed from the lock information object. If no other client application identifiers remain, then the status is changed to unlocked.

Figure 5:
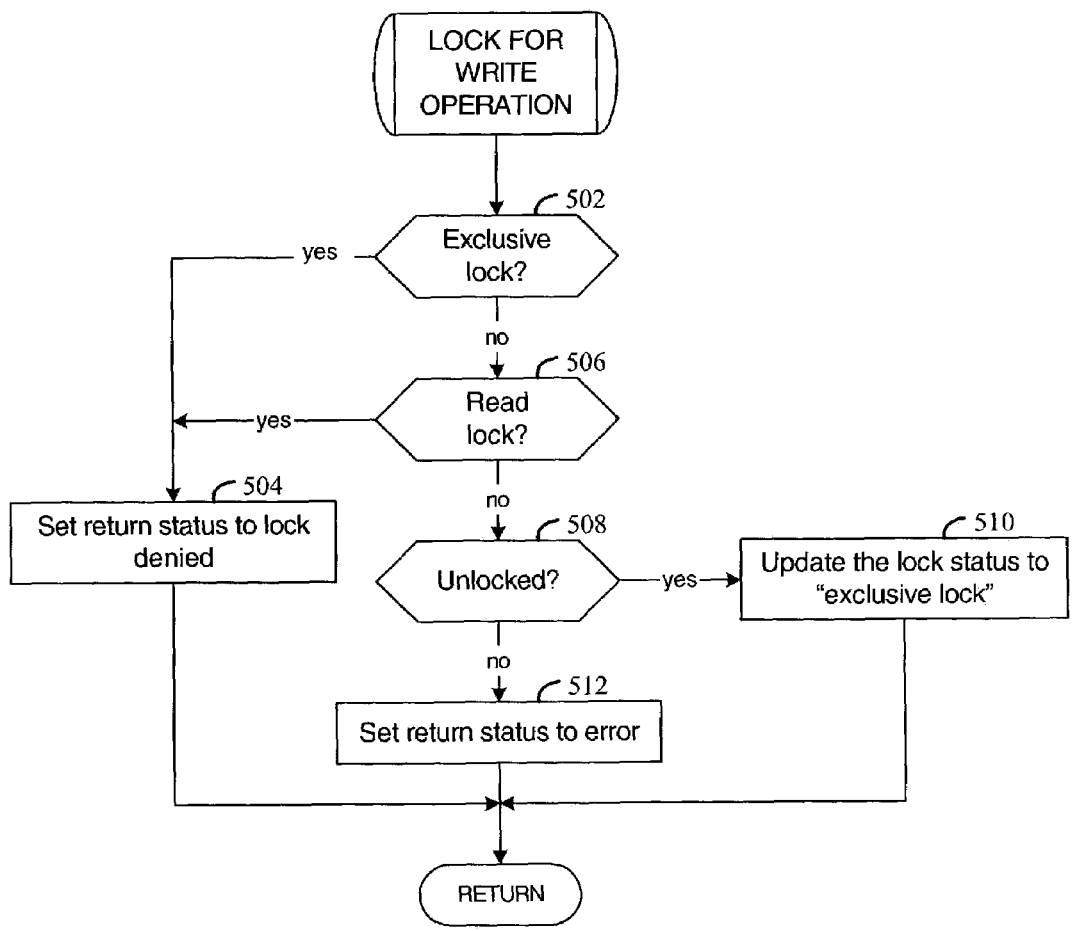
FIG. 5 is a flowchart of an example process implemented by a client application for obtaining a lock on a partition in support of a write operation.

FIG. 5 is a flowchart of an example process implemented by a client application for obtaining a lock on a partition in support of a write operation. The illustrated process steps assume that the semaphore has been obtained and the appropriate lock information object has been read.

If the desired partition is presently exclusively locked (decision step 502), a status code is returned to indicate that the needed lock cannot be obtained (step 504) and control is returned to step 310 (FIG. 3) of the client application. Otherwise, the process checks whether there is read lock on the partition (decision step 506). If so, an exclusive lock cannot be obtained, and the appropriate status code is return.

If the desired partition is presently unlocked (decision step 508), the lock status is set to exclusive lock. An error status is returned if the lock status has an illegal value (step 464).

It will be appreciated that in releasing an exclusive lock, the client application changes the lock status of the lock information object to unlocked.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for controlling concurrent access to a data set and has been found to be particularly applicable and beneficial in controlling concurrent access a persistently stored data set. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for controlling access to a data file that is shared amongst a plurality of client applications, comprising:

organizing the data file into a plurality of partitions;

persistently storing a lock file that is accessible to the plurality of client applications, the lock file including lock objects corresponding to the plurality of partitions and each lock object indicating a lock status of a corresponding partition of the plurality of partitions;

a client application of the plurality of client applications attempting to perform a first atomic file system operation on a persistent file system object when the client application seeks exclusive access to the lock file;

wherein the first atomic file system operation is to create a predetermined file system object and indicates an attempt to obtain a semaphore used to control exclusive access to the lock file, and each of the plurality of clients is configured to create the predetermined file system object for seeking to obtain the semaphore; and if the first atomic file system operation is successful, the client application testing the lock status of a lock object that corresponds to a selected partition of the plurality of partitions, and responsive to the lock status being compatible with access sought to the selected partition, updating the lock status, whereby the selected partition is designated as locked, deleting the predetermined file system object after updating the lock object, and accessing the selected partition, and responsive to the lock status being incompatible with the access sought deleting the predetermined file system object and refraining from updating the lock status and from accessing the selected partition; and wherein the first atomic file system operation being successful indicates that the client application obtained the semaphore, and deleting the predetermined file system object releases the semaphore; and in response to the first atomic file system operation being unsuccessful, the client application selecting an alternative operation to the updating of the lock status.

2. The method of claim 1, further comprising, after access to the selected partition is complete by the client application, the client application performing the steps of:

attempting to perform a second atomic file system operation on the persistent file system object;

wherein the second atomic file system operation is to create the predetermined file system object and indicates an attempt to obtain the semaphore;

if the second atomic file system operation is successful, updating the lock status of the lock object that corresponds to the selected partition, whereby the selected partition is designated as unlocked by the client application, deleting the file system object after updating the lock object.

3. The method of claim 1, wherein the plurality of partitions have at least two different sizes.

4. The method of claim 1, wherein the first atomic file system operation is creation of a predetermined directory.

5. The method of claim 1, wherein if the lock status of the selected partition is an exclusive lock, the client application refraining from updating the lock status and accessing the selected partition.

6. The method of claim 1, wherein if the lock status of the selected partition is a read lock and the client application does not seek to write to the selected partition, then adding a client identifier of the client application to the lock object.

7. The method of claim 1, wherein if the lock status of the selected partition is a read lock and the client application seeks to write to the selected partition, then the client application refraining from updating the lock status and refraining from writing to the selected partition.

8. The method of claim 1, wherein, if the lock status of the selected partition is unlocked and the client application seeks to write to the selected partition, then updating the lock status as exclusively locked.

9. An apparatus for controlling access to a data file that is shared amongst a plurality of client applications, comprising:
- means for organizing the data file into a plurality of partitions;
- means for persistently storing a lock file that is accessible to the client applications, the lock file including lock objects corresponding to the plurality of partitions and each lock object indicating a lock status of the corresponding partition;
- a client application of the plurality of client applications including means for attempting to perform a first atomic file system operation on a persistent file system object when the client application seeks exclusive access to the lock file;
- wherein the first atomic file system operation is to create a predetermined file system object and indicates an attempt to obtain a semaphore used to control exclusive access to the lock file, and each of the plurality of clients is configured to create the predetermined file system object for seeking to obtain the semaphore;
- the client application further including means for, if the atomic file system operation is successful, testing the lock status of a lock object that corresponds to a selected partition of the plurality of partitions, and responsive to the lock status being compatible with access sought to the selected partition updating the lock status whereby the selected partition is designated as locked, deleting the predetermined file system object after updating the lock object, and accessing the selected partition, and responsive to the lock status being incompatible with the access sought deleting the predetermined file system object and refraining from updating the lock status and from accessing the selected partition; and
- wherein the first atomic file system operation being successful indicates that the client application obtained the semaphore, and deleting the predetermined file system object releases the semaphore; and
- the client application further including means, responsive to the first atomic file system operation being unsuccessful, for selecting an alternative operation to the updating of the lock status.

10. The apparatus of claim 9, further comprising:
- the client application further including means for attempting, after access to the selected partition is complete, to perform a second atomic file system operation, and updating, if the second atomic file system operation is successful, the lock status of the lock object that corresponds to the selected partition whereby the selected partition is designated as unlocked by the client application, and deleting the predetermined file system object after updating the lock object; and
- wherein the second atomic file system operation is to create the predetermined file system object and indicates an attempt to obtain the semaphore.

11. An article of manufacture, comprising:
- a computer-readable storage medium configured with instructions for causing a computer to perform the steps of,
- organizing the data file into a plurality of partitions;
- persistently storing a lock file that is accessible to the client applications, the lock file including lock objects corresponding to the plurality of partitions and each lock object indicating a lock status of the corresponding partition;
- each client application attempting to perform a first atomic file system operation on a persistent file system object when the client application seeks exclusive access to the lock file;
- wherein the first atomic file system operation is to create a predetermined file system object and indicates an attempt to obtain a semaphore used to control exclusive access to the lock file, and each of the plurality of clients is configured to create the predetermined file system object for seeking to obtain the semaphore; and
- if the atomic file system operation is successful, the client application testing the lock status of a lock object that corresponds to a selected partition of the plurality of partitions, and responsive to the lock status being compatible with access sought to the selected partition, updating the lock status whereby the selected partition is designated as locked, deleting the predetermined file system object after updating the lock object, and accessing the selected partition, and responsive to the lock status being incompatible with the access sought deleting the predetermined file system object and refraining from updating the lock status and from accessing the selected partition; and
- wherein the first atomic file system operation being successful indicates that the client application obtained the semaphore, and deleting the predetermined file system object releases the semaphore; and
- in response to the first atomic file system operation being unsuccessful, the client application selecting an alternative operation to the updating of the lock status.

12. The article of manufacture of claim 11, wherein the computer-readable storage medium further includes instructions for causing a computer, after access to the selected partition is complete by a client application, to perform the steps of:
- attempting to perform a second atomic file system operation on the persistent file system object;
- wherein the second atomic file system operation is to create the predetermined file system object and indicates an attempt to obtain the semaphore;
- if the second atomic file system operation is successful, updating the lock status of the lock object that corresponds to the selected partition whereby the selected partition is designated as unlocked by the client application, deleting file system object after updating the lock object.

13. The article of manufacture of claim 11, wherein the partitions have at least two different sizes.

14. The article of manufacture of claim 11, wherein the first atomic file system operation is a create-directory operation.

* * * * *

UNITED STATES PATENT AND TRADEMARK OFFICE
CERTIFICATE OF CORRECTION

PATENT NO. : 7,444,349 B1 Page 1 of 1
APPLICATION NO. : 10/444912
DATED : October 28, 2008
INVENTOR(S) : Emil S. Ochotta It is certified that error appears in the above-identified patent and that said Letters Patent is hereby corrected as shown below:

On the title page, in the first column, item (75), add the following two inventors
-- Douglas P. Wieland, Sunnyvale, CA (US); Joseph D. Linoff, Redmond, WA (US) --.

Signed and Sealed this

Thirteenth Day of January, 2009

JON W. DUDAS
*Director of the United States Patent and Trademark Office*